INVENTORS.
PETER G. BARTLETT &
JOSEPH E. MESCHI
BY
*Meyer, Tilberry & Body*
ATTORNEYS Sept. 10, 1968  P. G. BARTLETT ET AL  3,401,378

FERROELECTRIC CAPACITOR MATRIX BIT LINE DRIVER

Filed Dec. 29, 1967  3 Sheets-Sheet 2

INVENTORS.
PETER G. BARTLETT &
JOSEPH E. MESCHI
BY
*Meyer, Tilberry & Body*
ATTORNEYS INVENTORS.
PETER G. BARTLETT &
JOSEPH E. MESCHI
BY
*Meyer, Tilberry & Body*
ATTORNEYS United States Patent Office 3,401,378

Patented Sept. 10, 1968

3,401,378
FERROELECTRIC CAPACITOR MATRIX BIT LINE DRIVER

Peter G. Bartlett, Davenport, Iowa, and Joseph E. Meschi, Lyons, Ill., assignors to E. W. Bliss Company, Canton, Ohio, a corporation of Delaware Filed Dec. 29, 1967, Ser. No. 694,708
8 Claims. (Cl. 340—173.2)

ABSTRACT OF THE DISCLOSURE

Apparatus is disclosed herein for applying binary signals to a ferroelectric storage capacitor matrix. Voltage levels of various values are applied to opposing surfaces of each memory means in a matrix. The values of these voltages are dependent upon the polarization potential required to polarize a memory means. An improved bit line driver circuit serves to apply voltage levels to bit lines of the matrix during the process of applying binary signals to the matrix.

*Disclosure*

This invention relates to the art of ferroelectric storage capacitors and, more particularly, to an improved bit line driver circuit for use in applying binary signals for storage in a ferroelectric capacitor matrix. Also, this invention relates to improvements upon the ferroelectric structures disclosed in application, Ser. No. 527,223, filed Feb. 14, 1966, and application, Ser. No. 640,717, filed May 23, 1967, both assigned to the same assignee as the present invention, and which applications are herein incorporated by reference. Further, this invention is directed toward an improved bit line driver circuit over that disclosed in our previous United States application, Ser. No. 694,596, filed Dec. 29, 1967, entitled Improvements in Ferroelectric Storage Capacitor Matrices, and which is assigned to the same assignee as the present invention.

In recent years, attention has been directed toward utilizing ceramic materials in the computer field. In particular, attention has been directed toward utilizing the electrostrictive piezoelectric and ferroelectric characteristics found in many of these materials. Ferroelectric storage devices, or capacitors, comprise dielectric materials which depend upon internal polarization rather than upon surface charge for storage of information. A number of such materials are known, such as barium titanate, Rochelle salt, lead metaniobiate and lead titanate zirconate composition. These materials may be prepared in the form of single crystals or ceramics, upon which conductive coatings may be applied to provide terminals. Ferroelectric capacitors exhibit two stable states of polarization, somewhat similar to the stable remanence states of magnetic materials, when subjected to electric fields of opposite polarities, and, as a consequence, are readily adapted for use as binary storage elements. As storage elements, these materials exhibit characteristics that render them usable over a greater temperature range than that of ferromagnetic cores and, for example, have been found to be usable over a range greater than −55° C. to 125° C. The further characteristic of ferroelectric capacitors is the piezoelectric property, or characteristic, of changing dimensions in response to potentials applied across the terminals of the capacitor and, conversely, of producing a voltage differential between the terminals in response to mechanical pressures exerted between the opposing faces of the capacitor.

United States patent application, Ser. No. 527,223, discussed hereinbefore, discloses a memory device incorporating ferroelectric capacitors. The memory device disclosed therein includes a pair of substantially flat, ferroelectric capacitor plates, one serving as a drive plate and the other as a memory plate. A layer of conductive material is interposed between the two plates. The plates are secured together in such a manner, as by an electrically conductive bond or by heat fusing, so that the drive plate may transmit mechanical forces to the memory plate in directions acting both laterally and perpendicularly of the plane defined by the memory plate, so as to thereby mechanically stress the memory plate. The drive plate is permanently prepolarized and the memory plate is polarized either negatively or positively by application of an electric potential between its opposing flat surfaces, so that it stores binary information, i.e., polarized negatively or positively. When an interrogating readout voltage is applied between opposing surfaces of the drive plate, its dimensions change in directions extending laterally and perpendicularly of its plane, which forces act to also mechanically stress the memory plate which develops an output signal dependent on its state of polarization. This output signal has a duration substantially that of the applied interrogating readout voltage. If the readout voltage is of a polarity opposite to the direction of polarization of the drive plate, then the magnitude of the interrogating readout voltage is kept well below the polarization threshold voltage, i.e., the voltage required to permanently polarize the drive plate, so that the readout process is nondestructive and can be interrogated indefinitely without need for an automatic rewrite cycle, as is normally required in destructive readout memory devices.

In addition to the single bit memory devices, described above, application, Ser. No. 527,223 also discloses a memory matrix having several word lines, each having associated therewith more than one bit. This memory matrix includes one driver plate for each word line having a plurality of ferroelectric memory plates secured thereto to define a plurality of bits. Similarly, application Ser. No. 640,717 discloses a memory matrix having several word lines, each having associated therewith more than one bit. In this matrix, however, a single drive plate and a single memory plate are secured together as a monolithic construction, in which several memory bits, are defined. Each bit, for example, is defined in a portion of the memory plate taken between two conductive strips on opposite surfaces of the memory plate.

It is particularly desirous that minimum structure and time be required to program or write a memory matrix. Thus, such a matrix may include eight word lines, each having eight bits defined therein, for a total of sixty-four bits. The structure and time required to correctly program all of the bits of such a matrix, one at a time, would be extremely complex. Further, in order to reduce the size of the matrix, a monolithic construction, of the nature disclosed in application, Ser. No. 640,717, may be desired. In such case, it would be extremely difficult to program each of the bits, if programmed one at a time. Accordingly, whether a matrix takes the form of a plurality of discrete memory cells, or separate word lines each having discrete memory plates mounted thereon, or a monolithic construction, it is desirable to provide a relatively easy manner of programming the matrix so that the correct pattern of binary signals may be stored therein.

The present invention is directed toward satisfying the foregoing needs of easily programming a ferroelectric capacitor matrix so that the desired pattern of binary signals may be stored in the matrix with minimum structure and programming time.

The present invention contemplates the provision of a ferroelectric capacitor matrix having a plurality of rows and columns, each including a plurality of ferroelectric memory means having first and second oppositely facing surfaces.

The present invention further contemplates the provision of an electrically conductive bit line associated with each column and adapted to be electrically connected to a first surface of each memory means in that column; an electrically conductive common line associated with each row and adapted to be electrically connected to a second surface of each memory means in that row; each bit line being coupled to a bit line driver means for selectively applying a direct current voltage level V1, representative of a binary "1" signal, or a direct current voltage level V2, representative of a binary "0" signal, to the first surfaces of the memory means in the associated row; each common line being coupled to a common line drive means for applying direct current voltage levels V3 and V4, at different points in time, to the common line; and, the voltage levels being selected so that $+Vp=V1-V4$ and $-Vp=V2-V3$, where V$p$ is the polarization voltage required between the first and second surfaces to polarize a memory means to respectively store a binary "1" signal or a binary "0" signal.

In accordance with the present invention, each bit line driver means includes a transformer having a primary winding and a secondary winding, a center tap on the secondary winding dividing same into first and second winding portions, the center tap being coupled to a reference voltage; the primary winding being adapted to be coupled across a voltage source so that an induced voltage may be obtained in the secondary winding, and the primary and secondary windings being so arranged that an induced voltage in the first winding portion adds to the reference voltage to obtain voltage level V1 and that an induced voltage in the second winding portion subtracts from the reference voltage to obtain voltage level V2; and, winding control means for selectively connecting either the first winding portion on the second winding portion between the center tap and the bit line so that either the first level voltage V1 or the second level voltage V2 is applied to the bit line.

The primary object of the present invention is to provide apparatus for easily and quickly programming a ferroelectric capacitor matrix having several memory bits.

A still further object of the present invention is to provide apparatus for easily programming the ferroelectric capacitor matrices constructed in accordance with United States patent applications, Ser. Nos. 527,223 and 640,717.

A still further object of the present invention is to provide programming apparatus for a ferroelectric capacitor matrix which apparatus includes an improved bit line driver circuit for applying voltage levels to one of the surfaces of a ferroelectric capacitor.

A still further object of the present invention is to provide circuitry which is relatively simple for manufacture and economical in use for programming ferroelectric capacitor matrices.

The foregoing and other objects and advantages of the invention will become apparent from the following description of the preferred embodiments of the invention as read in connection with the accompanying drawings in which.

BACKGROUND DISCUSSION

Figure 1:
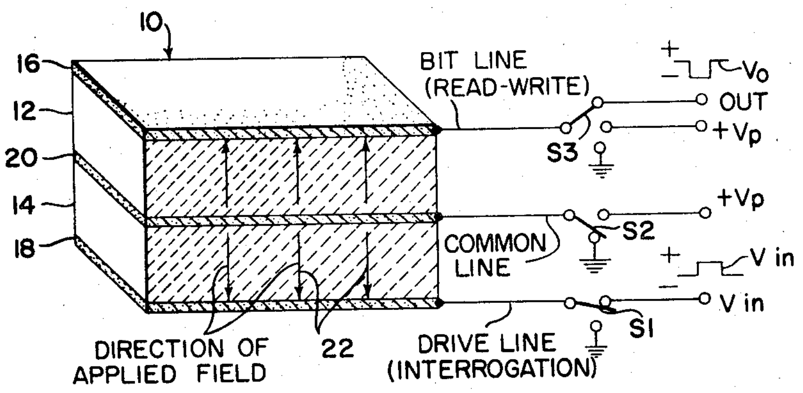
FIGURE 1 is a schematic illustration of a ceramic memory single bit construction, illustrating the principles upon which the present invention is based.

Before describing the preferred embodiments of the invention, attention is directed toward the following description of a single bit memory device constructed in accordance with the teachings of United States patent application, Ser. No. 527,223. As shown in FIGURE 1, that structure includes a single bit ceramic memory device 10, which generally comprises a memory plate 12 constructed of ferroelectric material, such as barium titanate, Rochelle salt, lead metaniobiate or lead titanate zirconate composition, for example. In its preferred form, however, memory plate 12 is constructed of lead titanate zirconate composition since it is easy to polarize. drive plate 14 is preferably constructed of ferroelectric material having piezoelectric characteristics, such as lead titanate zirconate composition. However, the drive plate may be constructed of any material that will change its dimensions upon application of an electric signal, such as, for example, magnetostrictive material which upon application of current thereto will undergo physical dimension changes. Drive plate 14 is permanently polarized and need not be constructed of easily polarizable material, such as lead titanate zirconate composition.

Plates 12 and 14 are, in their unstressed condition, approximately flat, and are oriented so as to be in substantial superimposed parallel relationship. The upper surface of plate 12 is coated with an electrically conductive layer 16, and the lower surface of plate 14 is coated with an electrically conductive layer 18. Layers 16 and 18 may be of any suitable electrically conductive material, such as silver. Interposed between facing surfaces of plates 12 and 14 there is provided a third layer 20 of electrically conductive material. Layer 20 may be constructed of a conductive epoxy, such as epoxy silver solder, so that facing surfaces of plates 12 and 14 are electrically connected together as well as mechanically secured together. In this manner, as will be described below, when drive plate 14 is stressed it, in turn, transmits mechanical forces to plate 12 so as to mechanically stress plate 12 in directions acting both laterally and perpendicularly of its plane.

Drive plate 14 may be permanently polarized by applying an electric field across its opposing flat surfaces. Thus, as shown in FIGURE 1, layer 18 is electrically connected to a single pole, double throw switch S1 which serves to connect layer 18 with either an electrical reference, such as ground, or to an interrogating readout voltage source $V_{in}$. Similarly, layer 20 is connected with the single pole, double throw switch S2. Switch S2 serves to connect layer 20 with either an electrical reference, such as ground, or to a source of polarizing voltage +V$p$. Plate 14 may now be polarized by connecting layer 20 with the +V$p$ voltage and layer 18 to ground potential. Thus, an electrical field of sufficient magnitude to polarize plate 14 is applied across the opposing faces of the plate. The direction of the electric field is indicated by arrows 22. Thereafter, switches S1 and S2 may be returned to positions as shown in FIGURE 1 for a subsequent readout operation.

Binary information may be stored in memory plate 12 by applying an electric field between the opposing faces of the plate in either one of two directions, so that the plate stores either a binary "1" or a binary "0" signal. Layer 16 is connected to a single pole switch S3. Switch S3 serves to connect layer 16 with either a ground potential, or a +V$p$ source of polarizing potential, or to an output circuit OUT. When it is desired to store a binary "1" signal in memory plate 12, switches S2 and S3 are manipulated so that +V$p$ potential is applied to layer 16 and ground potential is applied to layer 20. As shown in FIGURE 1, however, memory plate 12 stores a binary "0" signal, which results from having applied $+Vp$ potential to layer 20 and ground potential to layer 16.

With switches S1, S2 and S3 in the positions shown in FIGURE 1, an interrogating input voltage $V_{in}$ is applied to layer 18. If the applied voltage $V_{in}$ is of a polarity opposite to the direction of polarization of the drive plate, then the magnitude of this interrogating voltage is kept well below the polarization voltage threshold, i.e., the voltage required to permanently polarize drive plate 14, so that the readout process is nondestructive. Application of the readout voltage pulse causes the drive plate to contract or expand in the direction dependent on its prepolarization, as well as the polarity of the applied readout voltage pulse. The direction of contraction or expansion will be both laterally and perpendicularly of the plane defined by plate 14. Since plates 12 and 14 are bonded together, as by the layer 20 or conductive epoxy, any change in physical dimensions of plate 14 will cause corresponding changes in physical dimensions of plate 12. When the memory plate is thus stressed, it develops a voltage which appears between layers 16 and 20, with the polarity at layer 20 being positive or negative, dependent on the state of prepolarization of the memory plate, as well as the direction of mechanical stress. Thus, with reference to FIGURE 1, the output voltage $Vo$ will be a negative pulse representative that a binary "0" signal is stored by plate 12. For a further description of a ceramic memory device as shown in FIGURE 1, reference should be made to United States patent application, Ser. No. 527,223.

CERAMIC MEMORY MATRIX

Figure 2:
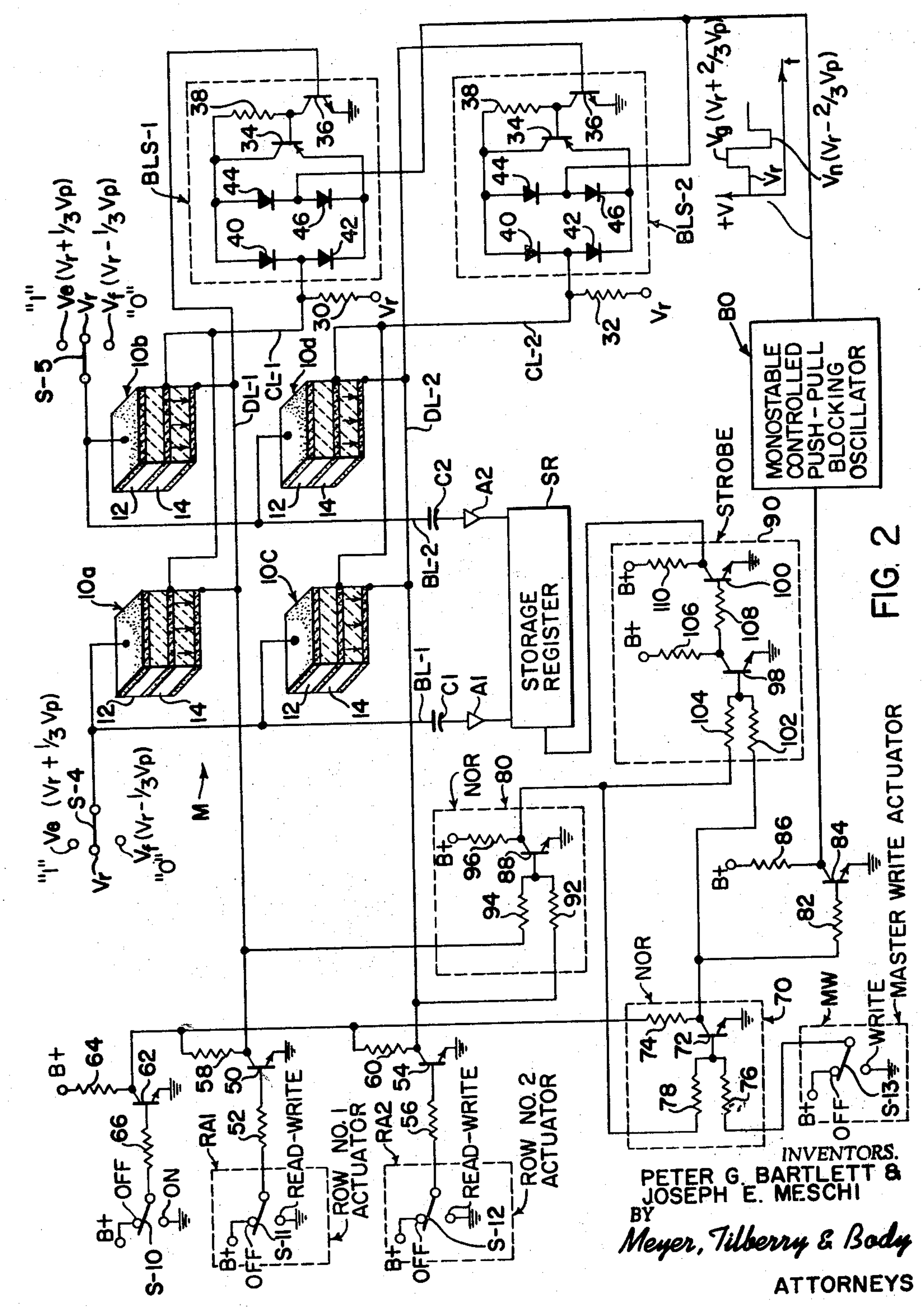
FIGURE 2 is a schematic illustration of a ferroelectric capacitor matrix together with circuitry for programming and interrogating the matrix.

Having now described the single bit ceramic memory device, together with the manner in which binary information is stored and interrogated, reference is now made to the ceramic memory matrix M of FIGURE 2. For purposes of simplification, this matrix is shown as including only four ceramic memory devices 10*a*, 10*b*, 10*c*, 10*d*, each corresponding with the single bit ceramic memory device 10 illustrated in FIGURE 1. These four memory devices are arranged in two vertical columns and two horizontal rows; to wit, a first column includes devices 10*a* and 10*c*, a second column includes devices 10*b* and 10*d*, a first row includes devices 10*a* and 10*b*, and a second row includes devices 10*c* and 10*d*. A common bit line BL–1 is electrically connected to the upper surface of memory plates 12 of the ceramic memory devices 10*a* and 10*c*. A second common bit line BL–2 is electrically connected to the upper surfaces of memory plates 12 of ceramic memory devices 10*b* and 10*d*. Bit line BL–1 is also connected to a three position switch S–4 for respectively applying to the bit line either an open circuit potential, a first direct current voltage level $Ve$ or a second direct current voltage level $Vf$. Voltage level $Ve$ is equal to a reference potential $Vr+1/3\,Vp$ ,where $Vp$ is the value of the polarization potential required to polarize a memory plate 12. Also, voltage level $Vf$ is equal to $Vr-1/3\,Vp$. Similarly, bit line BL–2 is also connected to a three position switch S–5 for selectively connecting bit line BL–2 with either an open circuit potential or direct current voltage level $Ve$ or direct current voltage $Vf$. Accordingly, if the reference voltage is 104 volts and the polarization voltage is 120 volts, then voltage level $Ve$ is equal to 144 volts and voltage level $Vf$ is equal to 64 volts.

A common line CL–1 is electrically connected to the lower surface of memory plates 12 in the ceramic memory devices 10*a* and 10*b*. Similarly, a common line CL–2 is electrically connected to the lower surfaces of memory plates 12 in memory devices 10*c* and 10*d*. Resistors 30 and 32 are respectively connected between ground and common lines CL–1 and CL–2.

Common lines CL–1 and CL–2 are respectively coupled to bilevel switch circuits BLS–1 and BLS–2. These circuits are identical and each includes a PNP transistor 34, an NPN transistor 36, a resistor 38, and four diodes 40, 42, 44 and 46. Diodes 40 and 41 are connected together in series across the collector to emitter circuit of transistor 34. The junction between diodes 40 and 42 is connected to the common line CL–1 for circuit BLS–1, or to the common line CL–2 for circuit BLS–2. Also, diodes 44 and 46 are connected together in series across the collector to emitter circuit of transistor 34. The junctions of diodes 44 and 46 in both circuits BLS–1 and BLS–2 are coupled to the output of a monostable controlled push-pull oscillator BO. Resistor 38 is connected across the base to collector circuit of transistor 34 and thence to the collector of transistor 36. The emitter of transistor 36 is connected to ground.

The output of the blocking oscillator BO, the description of operation to be given in detail hereinafter, is a positive voltage and incorporates two voltage levels with respect to a reference voltage $Vr$. These levels include voltage level $Vg$ and voltage level $Vh$, as shown by the graph of voltage versus time in FIGURE 3. Voltage level $Vg$ may, for example, be equal to voltage level $Vr$ plus ⅔ of the value of polarization potential $Vp$. Similarly, voltage level $Vh$ may be equal to the voltage level $Vr$ less ⅔ of the value of polarization potential $Vp$. Thus, for example, if the polarization potential is 120 volts, and the value of this potential is dependent upon the thickness of a memory plate 12 as well as the type of material employed, then with a reference voltage $Vr$ equal to 104 volts, it is seen that voltage level $Vg$ is 184 volts and voltage $Vh$ is 24 volts.

Common line CL–1 is also electrically connected to the upper surfaces of driver plates 14 of memory devices 10*a* and 10*b* by means of the electrically conductive epoxy 20 between plates 12 and 14. Similarly, common line CL–2 is electrically connected to the upper surfaces of driver plates 14 of memory devices 10*c* and 10*d*. A drive line DL–1 is electrically connected to the lower surfaces of driver plates 14 of memory devices 10*a* and 10*b*, as well as to the base of transistor 36 in the bilevel switch circuit BLS–1.

Bit line BL–1 is coupled through a series circuit including capacitor C1 and bit line amplifier A1 to a storage register SR. Similarly, bit line BL–2 is coupled through a series circuit including capacitor C2 and bit line amplifier A2 to the storage register SR. The storage register SR may take any suitable form, such as a temporary storage register.

In FIGURE 2, a pair of row actuators RA1 and RA2 are provided for respectively actuating row No. 1, i.e., the row which includes memory devices 10*a* and 10*b*, and row No. 2, i.e, the row that includes memory devices 10*c* and 10*d*. Actuator RA1 includes a two position switch S–11 for connecting the base of an NPN transistor 50 with either B+ potential (off position) or ground potential (read-write position). Switch S–11 is coupled to the base of transistor 50 through a suitable resistor 52. The collector of transistor 50 is connected directly with drive line DL–1. Similarly, actuator RA2 includes a two position switch S–12 which is coupled to the base of an NPN transistor 54 through a resistor 56. The collector of transistor 54 is directly connected with drive line DL–2.

The collectors of transistors 50 and 54 are respectively connected through resistors 58 and 60 to the collector of an NPN transistor 62. Transistor 62 has its emitter connected to ground and its collector connected through a resistor 64 to a B+ voltage supply source. Also, the base of transistor 62 is coupled through a resistor 66 to a two position switch S–10. Switch S–10 serves to connect resistor 66 with either a B+ potential (off position) or with ground potential (on position).

A master write actuator circuit MW is also included in the embodiment of FIGURE 2, and includes a two position switch S–13 for connecting one input of a NOR circuit 70 with either a ground potential (write position) or B+ potential (off position). NOR circuit 70 is an RLT NOR circuit and includes an NPN transistor 72 having its emitter connected to ground and its collector connected through a resistor 74 to the collector of transistor 64. The base of transistor 72 is connected through a resistor 76 to the switch S–13 in master write actuator circuit MW. A second input to the base of transistor 72 is taken through a resistor 78 from the output circuit of another NOR circuit 80. The output of NOR circuit 70 is taken at the collector of transistor 72 and is applied to the input of a strobe circuit 90 as well as through a resistor 82 to the base of an NPN transistor 84. Transistor 84 has its emitter connected to ground and its collector connected through a resistor 86 to a B+ voltage supply source. Also, the collector of transistor 84 is connected through a resistor 86 to a B+ voltage supply source. Also, the collector of transistor 84 is connected to the input of blocking oscillator BO.

NOR circuit 80 is identical to NOR circuit 70 and includes an NPN transistor 88, a pair of input resistors 92 and 94 which are coupled to the base of the transistor. More particularly, resistor 94 connects the collector of transistor 50 with the base of transistor 88 and resistor 92 connects the collector for transistor 54 with the base of transistor 88. The collector of transistor 88 is connected through a resistor 96 to a B+ voltage supply source. The output of NOR circuit 80 is taken at the collector of transistor 88 and is connected both to one input, at resistor 74, of NOR circuit 70, as well as to one input of strobe circuit 90.

Strobe circuit 90 includes a pair of NPN transistors 98 and 100. Transistor 98 is connected in a NOR circuit configuration with one input to its base being taken through a resistor 102 from the collector of transistor 72. The other input to the base of transistor 98 is taken through a resistor 104 from the collector of transistor 88. The collector of transistor 98 is connected through a resistor 106 to a B+ voltage supply source. Transistor 100 has its base connected through a resistor 108 to the collector of transistor 98 and its emitter connected to ground. Also, transistor 100 has its collector connected through a resistor 110 to a B+ voltage supply source. The output of strobe circuit 90 is taken at the collector of transistor 100 and is connected to the storage register SR.

BLOCKING OSCILLATOR

Figure 3:
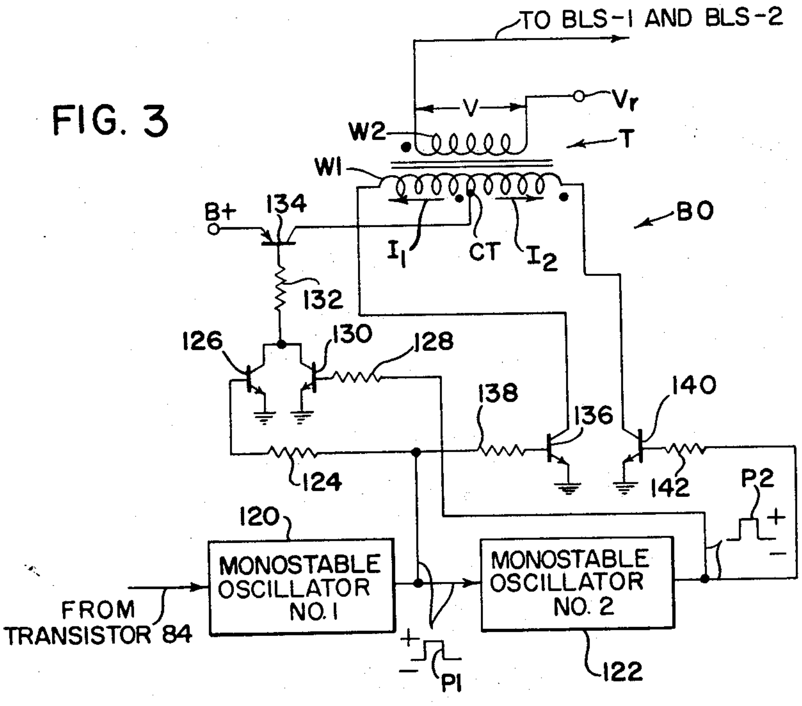
FIGURE 3 is a schematic illustration of a monostable controlled push-pull blocking oscillator used in conjunction with the matrix in FIGURE 2.

The preferred form of block oscillator BO is shown in FIGURE 3, and it includes a pair of series connected monostable oscillators 120 and 122. The input for oscillator 120 is taken from the collector of transistor 84 and the output of oscillator 120 is applied to the input of oscillator 122. The output of oscillator 120 is also connected through a resistor 124 to the base of an NPN transistor 126 having its emitter connected to ground. Similarly, the output of oscillator 122 is connected through a resistor 128 to the base of an NPN transistor 130 having its emitter connected to ground. The collectors of transistors 126 and 130 are connected together in common and thence through a resistor 132 to the base of a PNP transistor 134 having its emitter connected to a B+ voltage supply source. The collector of transistor 134 is connected to a center tap CT on a primary winding W1 of a transformer T. The left end of primary winding W1 is connected to the collector of NPN transistor 136 having its emitter connected to ground and its base connected through a resistor 138 to the output of oscillator 120. Similarly, the right end of winding W1 is connected to the collector of an NPN transistor 140 having its emitter connected to ground and its base connected through a resistor 142 to the output of oscillator 122. The secondary winding W2 of transformer T has its right end connected to the reference voltage source V*r* and its left end connected in common to all of the bilevel switch circuits BLS–1 and BLS–2 (see FIGURE 3). The transformer windings are connected in accordance with the polarity of the black dots shown in FIGURE 3.

The operation of oscillator BO commences when transistor 84 (see FIGURE 2) is biased into conduction. As transistor 84 is biased into conduction, a negative going signal is applied from the collector of transistor 84 to oscillator 120. Oscillator 120 is a typical monostable oscillator and, as is well known, serves upon receipt of a negative going signal to provide a positive output pulse P1 (see FIGURE 3) of a given magnitude and given duration. Pulse P1 is applied to the base of transistor 126 as well as the input circuit of monostable oscillator 122. Monostable oscillator 122 does not provide an output pulse P2 until it receives the trailing or negative going edge of pulse P1. In the meantime, pulse P1 serves to forward bias transistor 126 which, in turn, forward biases transistor 134. Accordingly, essentially B+ potential is applied to the center tap CT of winding W1. Pulse P1 also serves to bias transistor 136 into conduction so that essentially ground potential is applied to the left end of winding W1. Thus, for the duration of pulse P1 current flows from the center tap CT through the left half of winding W1 to ground, in accordance with the direction of arrow I1. A voltage V is induced in secondary winding W2 of a polarity in accordance with the black dots shown in FIGURE 4. Thus, voltage V adds to voltage V*r*. The magnitude of voltage V is on the order of ⅔ V*p*, as determined by such factors as the transformer winding ratio.

On the negative going, or trailing, edge of pulse P1, monostable oscillator 122 is actuated to provide output pulse P2. This pulse forward biases transistors 130 and 140. Also, since transistor 130 is now biased into conduction, transistor 134 becomes conductive to apply essentially B+ potential to the center tap CT. Since transistor 140 is also forward biased it essentially applies ground potential to the right end of winding W1. Accordingly, current flows, during the duration of pulse P2, through the right half of winding W1 in accordance with the direction of arrow I2. The induced voltage V in the secondary winding W2 will subtract from the reference voltage V*r*. From the foregoing discussion, it is seen that each time transistor 84 is biased into conduction a train of two pulses V*g* and V*h* (see FIGURE 2) are applied to all of the bilevel switch circuits BLS–1 and BLS–2.

OPERATION

If it is desired to store a binary "1" signal in a memory plate 12, then the upper surface of that memory plate should be connected to voltage level V*e*. If, however, a binary "0" signal is to be stored, the upper surface of a memory plate 12 must be connected with voltage level V*f*. As will be discussed hereinafter, voltage levels V*g* and V*h* are applied at different times to the lower surfaces of memory plates 12. If the potential on the upper surface of a memory plate is V*e* and the potential on the lower surface is V*g*, then the potential difference is −⅓ V*p*, which is not sufficient to polarize the memory plate. However, if the potential on the lower surface is V*h* then the potential difference is +V*p*, which positively polarizes the memory plate to store a binary "1" signal. Similarly, if the potential on the upper surface of a memory plate 12 is V*f* and the potential on the lower surface is V*h*, then the voltage difference is −⅓ V*p*, which is insufficient to polarize the memory plate. However, if the potential on the lower surface of that memory plate is V*g*, then the potential difference is −V*p* which serves to negatively polarize that memory plate to store a binary "0" signal.

Application of binary information to be stored in matrix M is accomplished one row at a time. First, switches S–4 and S–5 are manipulated, as desired, for storage of either binary "1" or binary "0" signals. Then, switch S–10 is manipulated to its "on" position so that transistor 62 is reverse biased. This applies essentially B+ potential to the collectors of transistors 50, 54 and 74. During the write operation of row No. 1, the next step is to manipulate switch S–11 from its "off" position to its "read-write" position. This reverse biases transistor 50 so that the positive potential at its collector is applied as an actuating signal to forward bias transistor 36 in bilevel switch circuit BLS–1. After switch S–11 has been manipulated to its "read-write" position, the operator then manipulates switch S–13 in the master write actuator circuit MW to its "write" position. Since the potential on the collector of transistor 50 is essentially at B+ potential and the potential on the collector of transistor 54 is essentially at ground potential, transistor 88 in NOR circuit 80 is biased into conduction. Accordingly, the potential on the collector of transistor 88 is essentially at ground and this potential is applied through resistor 78 in NOR circuit 70 to the base of transistor 72. Since switch S–13 now applies a ground signal through resistor 76 to the base of transistor 72, this transistor is reverse biased and its collector applies essentially a B+ potential to the base of transistor 84. Accordingly, transistor 84 is biased into conduction to energize oscillator BO. The output circuit of blocking oscillator BO carries a train of two voltage pulses respectively of voltage levels $Vg$ and $Vh$. These voltage levels are applied at different times to the bilevel switch BLS–1, which has been actuated into conduction due to the positioning of switch S–11 to the "read-write" position. Accordingly, memory devices 10*a* and 10*b* now become polarized to store binary signals in accordance with positioning of switches S–4 and S–5.

After row No. 1 has been written as discussed above, switch S–11 is returned to its "off" position and switch S–13 is returned to its "off" position. The circuitry is now in condition for applying binary signals to row No. 2. The same steps discussed above are repeated for this operation.

When it is desired to interrogate one of the rows, the associated row actuator switch S–11 or S–12 is manipulated to its "read-write" position. However, during this operation, the master write actuator switch S–13 is left in its "off" position. During the interrogation of row No. 1, switch S–11 is manipulated to its "read-write" position. This reverse biases transistor 50 so that its collector applies essentially a B+ potential to drive line DL–1. Thus, the voltage difference between the upper and lower surfaces of memory plates 14 in row No. 1 is changed by the value of the B+ potential. This potential corresponds with interrogation voltage $V_{L1}$, discussed previously with respect to FIGURE 1. The output voltages of memory devices 10*a* and 10*b* appear on bit lines BL–1 and BL–2 in accordance with the polarities of the stored binary signals. These output voltages are applied through capacitors C1 and C2 and amplifiers A1 and A2 to storage register SR. The register is strobed by strobe circuit 90 so that it is gated into conduction to receive these output signals from memory devices 10*a* and 10*b* only during the time that the matrix M is being interrogated. The gating signal to the storage register SR takes the form of a negative going signal. During the interrogation operation of row No. 1, the potential at the collector of transistor 88 of NOR circuit 80 is essentially at ground potential. Since the master write actuator switch S–13 is in its "off" position, the output taken at the collector of transistor 72 of NOR circuit 70 is essentially at ground potential. Accordingly, transistor 98 in strobe circuit 90 is reverse biased so that essentially a B+ forward biasing potential is applied to the base of transistor 100. This causes the potential on the collector of transistor 100 to decrease in a negative direction so that the storage register SR is gated on to receive the binary signals from ceramic memory devices 10*a* and 10*b*. The same procedure as discussed above with reference to interrogating row No. 1 is repeated when interrogating row No. 2.

BIT LINE DRIVER CIRCUITRY

Figure 4:
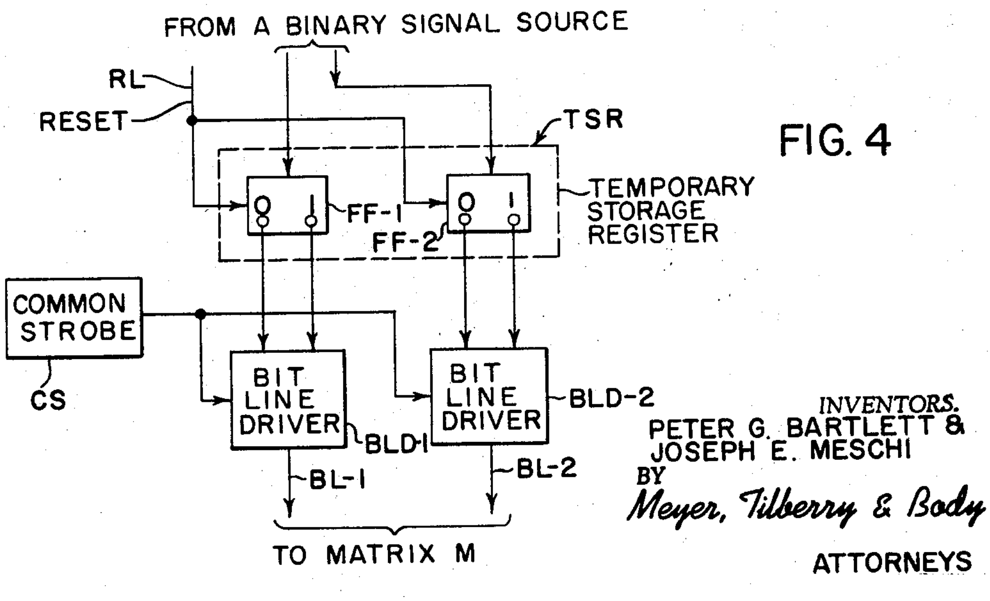
FIGURE 4 is a block diagram illustration of the bit line driver circuitry of the present invention; and, FIGURE 5 is a schematic illustration of a bit line driver constructed in accordance with the present invention.

In accordance with the present invention, switches S–4 and S–5 in FIGURE 2 are replaced by the circuitry illustrated in the block diagram of FIGURE 4. The circuitry in FIGURE 4 includes bit line drivers BLD–1 and BLD–2, having their outputs coupled to bit lines BL–1 and BL–2, respectively. The bit line drivers BLD–1 and BLD–2 are coupled to a temporary storage memory TSR having two flip-flops FF–1 and FF–2. These are standard flip-flops or bistable multivibrator circuits, each having a "0" output and a "1" output taken, for example, from the collectors of two NPN transistors. The "0" and "1" outputs of flip-flop FF–1 are coupled to bit line driver BLD–1. Similarly, the "0" and "1" outputs of flip-flop FF2 are coupled to bit line driver BLD–2. A common strobe CS is coupled to both bit line drivers BLD–1 and BLD–2. As is conventional, flip-flops FF–1 and FF–2 may be reset by application of a trigger signal over line RL so that neither of their outputs "0" nor "1" are energized.

Figure 5:
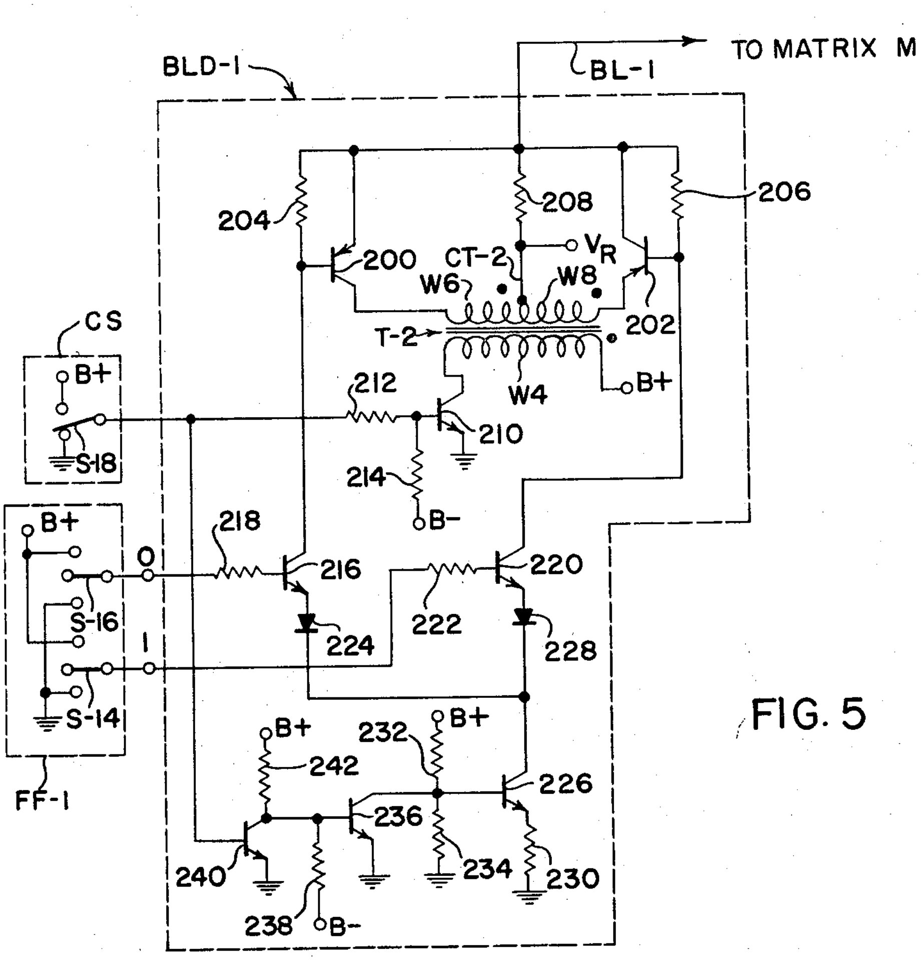

Referring now to FIGURE 5, there is shown a schematic illustration of the circuitry of bit line driver BLD–1. It is to be understood that the circuitry for bit line driver BLD–2 is identical to that of bit line driver BLD–1. Flip-flop FF–1 is shown in FIGURE 5, in a simplified manner, as being represented by two three-position switches S–14 and S–16. These two switches may be selectively manipulated to connect output 1 (for switch S–14) or output 0 (for switch S–16) with either ground potential, or B+ potential, or to open circuit. Similarly, the common strobe CS is shown in simplified manner in FIGURE 5 as including a two position switch S–18 which is normally connected to ground potential and may be manipulated to connect the bit line driver BLD–1 with B+ potential. It is to be understood that these switches S–14 and S–16 and S–18 are illustrative of the operation of a flip-flop as well as a common strobe, and would normally be comprised of well known solid state circuitry.

Bit line driver BLD–1 includes a saturable core transformer T–2 having a primary winding W–4 and a secondary winding divided into two winding portions W–6 and W–8 by means of a center tap CT–2. The center tap CT–2 is connected with the reference voltage source $Vr$. The left end of winding portion W–6 is connected to the collector of a PNP transistor 200 having its emitter connected to bit line BL–1. Similarly, the right end of winding portion W–8 is connected to the emitter of a PNP transistor 202 having its collector connected to bit line BL–1. A resistor 204 is connected between the base and emitter of transistor 200. Similarly, a resistor 206 is connected between the base and emitter of transistor 202. A resistor 208 is connected between bit line BL–1 and the reference voltage source $Vr$. The primary winding W–4 has its right end connected to a B+ voltage supply source and its left end connected to the collector of an NPN transistor 210, having its emitter connected to ground and its base connected through a resistor 212 to the switch S–18 of the common strobe CS. A resistor 214 is coupled to the junction of resistor 212 and the base of transistor 210 and thence to a B− voltage supply source.

The base of transistor 200 is also connected to the collector of an NPN transistor 216, having its base connected through a resistor 218 to the movable element of switch S–16 in the flip-flop FF–1. Similarly, the base of transistor 202 is connected to the collector of an NPN transistor 220, having its base connected through a resistor 222 to the movable element of switch S–14 in the flip-flop FF–1. The emitter of transistor 216 is coupled through a diode 224, poled as shown, to the collector of an NPN transistor 226. Similarly, the emitter of transistor 220 is connected through a diode 228, poled as shown, to the collector of transistor 226. Transistor 226 has its emitter connected to ground through a resistor 230 and its base connected to the junction of a voltage divider, including resistors 232 and 234 connected between the B+ voltage supply source and ground. The junction of resistor 232 and 234 is also connected to the collector of an NPN transistor 236, having its emitter connected to ground and its base connected through a resistor 238 to the B− voltage supply source. The junction of resistor 238 and the base of transistor 236 is connected to the collector of an NPN transistor 240, having its emitter connected to ground, and which serves as a signal inverter. Also, the collector of transistor 240 is connected through a resistor 242 to the B+ voltage supply source. The base of transistor 240 is connected to the movable element of switch S–18 in the common strobe CS. The black dots shown adjacent the transformer T–2 are polarity dots of the winding arrangement, whereby when a voltage is applied to primary winding W–4 the induced voltage in winding portion W–6 subtracts from the reference voltage $Vr$ and the induced voltage in winding portion W–8 adds to the reference voltage.

BIT LINE DRIVER OPERATION

The purpose of the bit line driver circuitry shown in FIGURE 5 is to apply voltage level $Ve$ or voltage level $Vf$ to bit line BL–1. These voltage levels are respectively representative of a binary "1" signal and a binary "0" signal. If a binary "1" signal is to be written into the memory devices of FIGURE 2, to which bit line BL–1 is connected, then switch S–14 is connected with the B+ voltage supply source so as to provide a positive signal at output 1 of flip-flop FF–1. As will be discussed hereinafter, this will result in a voltage level $Ve$ being carried by bit line BL–1. If, on the other hand, it is desired to write a binary "0" signal in the ceramic memory devices to which bit line BL–1 is connected, then switch S–16 is connected to the B+ voltage supply source which results in voltage level $Vf$ being carried on bit line BL–1. Neither voltage level $Ve$ or $Vf$ will appear on bit line BL–1 unless the common strobe CS is actuated to apply a positive potential to transistor 210 in each of the bit line drivers BLD–1 and BLD–2 during the write operation.

In the event it is desired to write a binary "1" signal in memory plates 12 in memory devices 10*a* and 10*c* in matrix M of FIGURE 2, then flip-flop FF–1 (FIGURE 4) must receive two pulses from a binary signal source so that its output circuit 1 carries a positive signal. This is equivalent to manipulating switch S–14 in the illustration of FIGURE 5 to apply a positive signal to output circuit 1. This forward biases transistor 220. At the point in time that it is desired to write the binary information, the common strobe CS is actuated to apply positive signals to all of the bit line drivers. Accordingly, in FIGURE 5, this is equivalent to manipulating switch S–18 to apply positive potential to the base of transistor 210. Transistor 210 is forward biased into conduction, whereupon essentially B+ voltage is impressed across primary winding W–4. Since the positive signal applied to transistor 210 is also applied to base of transistor 240, then this transistor is forward biased into conduction to reverse bias transistor 236. Since transistor 236 is reverse biased, transistor 226 is biased into conduction through resistor 232. Since transistors 220 and 226 are now biased into conduction, a potential approaching that of ground potential is applied to the base of PNP transistor 202 so that this transistor is biased into conduction. Accordingly, the voltage impressed across winding W–4 causes a voltage to be induced in winding portion W–8. This induced voltage is on the order of 40 volts, as determined by the turns ratio between the primary and secondary windings. The polarity of this voltage is in accordance with the polarity dots shown in FIGURE 5. Therefore, this induced voltage in winding portion W–8 adds to the reference voltage $Vr$ and the combined voltage is carried by bit line BL–1. If the reference voltage $Vr$ is 104 volts and the induced voltage in winding portion W–8 is 40 volts, then bit line BL–1 carries 144 volts, which, as discussed hereinbefore, is the voltage required for writing binary "1" signals in memory devices 10*a* and 10*c* of the matrix M in FIGURE 2.

The operation for writing a binary "0" signal is essentially the same with the exception that transistor 200 is forward biased into conduction and that the induced voltage in winding W–6 will subtract from the reference voltage $Vr$. If the induced voltage is 40 volts and the reference voltage is 104 volts, then a voltage of 64 volts will be carried on bit line BL–1 which, as discussed hereinbefore, is the voltage required for writing a binary "0" signal in memory devices 10*a* and 10*c*.

Although the invention has been shown in connection with a preferred embodiment, it will be readily apparent to those skilled in the art that various changes in form and arrangement of parts may be made to suit requirements without departing from the spirit and scope of the invention as defined by the appended claims.

What is claimed is:

1. In a ferroelectric capacitor matrix having a plurality of rows and columns each including a plurality of ferroelectric capacitor memory means having first and second oppositely facing surfaces, the improvement for storing binary "1" and binary "0" signals, as desired, in said memory means and comprising:
   - an electrically conductive bit line associated with each column and adapted to be electrically connected to the first surface of each memory means in said column;
   - an electrically conductive common line associated with each row and adapted to be electrically connected to the second surface of each memory means in said row;
   - each said bit line being coupled to a bit line driver means for selectively applying a direct current voltage level V1, representative of a binary "1" signal, or a direct current voltage level V2, representative of a binary "0" signal, to the first surfaces of the memory means in the associated row;
   - each said common line being coupled to a common line drive means for applying direct current voltage levels V3 and V4, at different points in time, to said common line, said voltage levels being selected so that $+Vp=V1-V4$ and $-Vp=V2-V3$, where $Vp$ is the polarization voltage required between said first and second surfaces to positively or negatively polarize a memory means to respectively store a binary "1" signal or a binary "0" signal;
   - each said bit line driver means including:
   - a transformer having a primary winding and a secondary winding, a center tap on said secondary winding dividing same into first and second secondary winding portions, said center tap being coupled to a reference voltage;
   - said primary winding adapted to be coupled across a voltage source so that an induced voltage may be obtained in said secondary winding, said primary and secondary windings being arranged that a said induced voltage in said first winding portion adds to said reference voltage to obtain voltage level V1 and in said second portion subtracts from said reference voltage to obtain voltage level V2; and,
   - winding control means for selectively electrically connecting either said first or said second winding portion between said center tap and said bit line so that either said first level voltage V1 or said second level voltage V2 is applied to said bit line.

2. In a ferroelectric capacitor matrix as set forth in claim 1 wherein said winding control means includes first and second actuatable switching means for, upon actuation, respectively coupling said first and second winding portions between said center tap and said bit line.

3. In a ferroelectric capacitor matrix as set forth in claim 2 wherein each said bit line driver means includes primary winding switching means for, upon actuation, electrically connecting said primary winding across said voltage source.

4. In a ferroelectric capacitor matrix as set forth in claim 3 including a common strobe means coupled to the primary winding switching means in each said bit line driver means to simultaneously actuate all of said primary winding switching means.

5. In a ferroelectric capacitor matrix as set forth in claim 2 including binary "1" circuit means for actuating said first actuatable switching means and binary "0" circuit means for actuating said second actuatable switching means.

6. In a ferroelectric capacitor matrix as set forth in claim 2 including means for providing a first signal representative of a binary "1" signal and second means for providing a second signal representative of a binary "0" signal and wherein each bit line driver means includes first and second control means responsive to said first and second signals for respectively actuating said first and second actuatable switching means.

7. In a ferroelectric capacitor matrix as set forth in claim 6 wherein each said bit line driver means includes a third actuatable switching means for, upon actuation, rendering both said first and second control means effective to respond to said first and second signals; and, a common strobe means coupled to the third actuatable switching means in each said bit line driver means to simultaneously actuate all of said third actuatable switching means.

8. In a ferroelectric capacitor matrix as set forth in claim 7 wherein each said bit line driver means also includes primary winding switching means for, upon actuation, electrically connecting said primary winding across said voltage source; and, wherein said common strobe means is also coupled to the primary winding switching means in each said bit line driver means to simultaneously actuate all of said primary winding switching means.

No references cited.

TERRELL W. FEARS, *Primary Examiner.*